(12) United States Patent
Lin et al.

(10) Patent No.: US 6,229,696 B1
(45) Date of Patent: May 8, 2001

(54) MOVABLE FRAME FOR RETAINING A COMPONENT IN A COMPUTER ENCLOSURE

(75) Inventors: Wan-Cheng Lin, Pen-Chiao (TW); Li-Yuan Gan, Chengdo (CN)

(73) Assignee: Hon Hai Precisin Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/330,223

(22) Filed: Jun. 10, 1999

(30) Foreign Application Priority Data

Aug. 31, 1998 (TW) .................................................. 87214316

(51) Int. Cl.⁷ ............................... H05K 7/16; H05K 5/00
(52) U.S. Cl. .................... 361/683; 361/683; 361/685; 361/686; 361/728; 312/302; 312/317.1
(58) Field of Search ............................ 361/683, 684–686, 361/728–733, 747, 725–727, 600, 678, 679, 688, 690, 695, 736, 741; 360/92.01, 98.01, 132, 137 D, 99.06; 369/75.1–82; 312/294, 300, 302, 313, 315, 317.1, 332.1, 333; 165/80.2, 80.3, 185

(56) References Cited

U.S. PATENT DOCUMENTS

| | | | |
|---|---|---|---|
| 3,868,158 | * | 2/1975 | Laboue ................................. 312/350 |
| 4,080,644 | * | 3/1978 | Reed et al. ............................ 361/363 |
| 4,738,632 | * | 4/1988 | Schmidt et al. ...................... 439/341 |
| 5,032,952 | * | 7/1991 | Cooke et al. ......................... 361/392 |
| 5,136,466 | * | 8/1992 | Remise et al. ........................ 361/391 |
| 5,172,305 | * | 12/1992 | DeWilde .............................. 361/415 |
| 5,680,293 | * | 10/1997 | McAnally et al. ................... 361/685 |
| 5,774,330 | * | 6/1998 | Melton et al. ........................ 361/683 |
| 5,808,864 | * | 9/1998 | Jung ..................................... 361/685 |
| 5,997,115 | * | 12/1999 | Radloff et al. ....................... 312/222 |

FOREIGN PATENT DOCUMENTS

| | | | |
|---|---|---|---|
| 6-236669 | * | 8/1994 | (JP) ...................................... 369/263 |
| 10-207571 | * | 8/1998 | (JP) .................................. G06F/1/16 |

* cited by examiner

Primary Examiner—Leo P. Picard
Assistant Examiner—Anatoly Vortman
(74) Attorney, Agent, or Firm—Wei Te Chung

(57) ABSTRACT

A movable frame is mounted in a computer enclosure for retaining a computer component, such as a power supply, in the computer enclosure. The frame includes a tray for supporting the power supply thereon and an elongate arm extending from the tray. A first end of the arm is pivotally attached to the computer enclosure by a vertically extending pivot pin whereby the frame is horizontally movable between a retracted position and an extended position for selectively positioning the power supply out of the computer enclosure. Openings may be defined on a second end of the arm for engaging with projections formed on the computer enclosure for securing the second end of the arm to the computer enclosure.

16 Claims, 5 Drawing Sheets

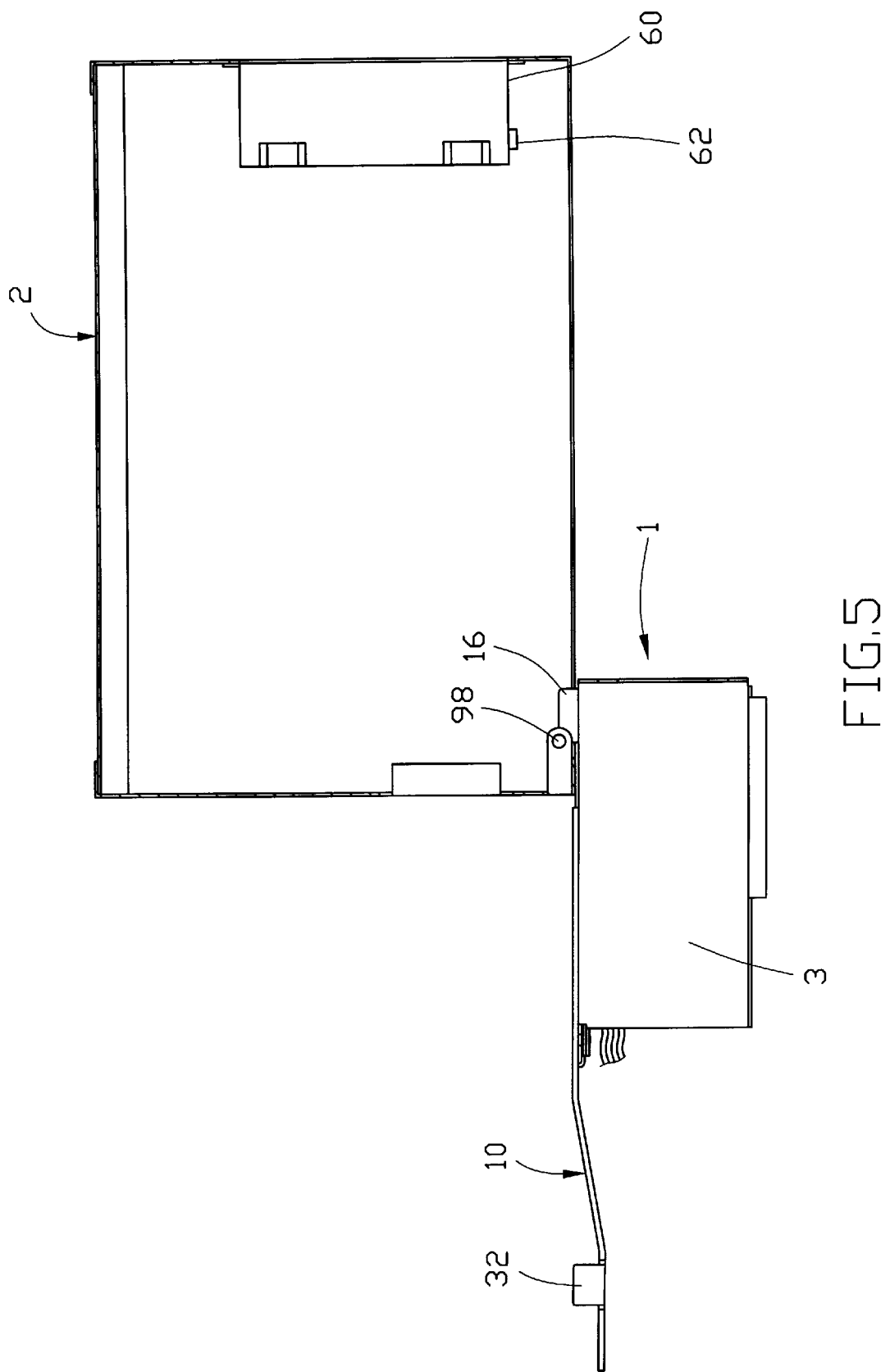

MOVABLE FRAME FOR RETAINING A COMPONENT IN A COMPUTER ENCLOSURE

BACKGROUND OF THE INVENTION

1. Field of the Invention

The present invention generally relates to a frame for retaining a component of a computer, and in particular to a movable frame for retaining a computer component in a computer enclosure.

2. The Prior Art

Computers are widely used and are becoming increasingly smaller. The small size of computers complicates maintenance and repair since the limited internal space of the computer prevents easy access to and removal of components thereof. To overcome the problem, movable frames are mounted in a computer enclosure for retaining a component, such as a power supply. The mobility of the frame allows the computer component to be selectively positioned outside the enclosure. Thus, the component is not only easily removed from the computer, but a free space is exposed within the enclosure for allowing maintenance or repair to be performed on other components fixed inside the computer.

Examples of movable frames for computer components are disclosed in U.S. Pat. No. 5,032,951 and Taiwan Patent Application No. 84213528. U.S. Pat. No. 5,032,951 discloses a pivotal frame for supporting a power supply. The pivotal frame requires non-standard bolts to secure the frame to the computer enclosure. Furthermore, the pivotal frame has to be carefully operated otherwise the power supply may be damaged after impacting the casing. Taiwan Patent Application No. 84213528 discloses a slidable frame which has a complicated structure thereby increasing costs.

Thus, it is desired to provide a movable frame for retaining a computer component that does not have the deficiencies discussed above.

SUMMARY OF THE INVENTION

Accordingly, an object of the present invention is to provide a movable frame for retaining a computer component, which facilitates maintenance and repair of the computer.

Another object of the present invention is to provide a movable frame for a computer having a simple structure which can be manufactured at a low cost.

A further object of the present invention is to provide a movable frame for securely retaining a component inside a computer enclosure.

To achieve the above objects, in accordance with the present invention, a movable frame is mounted in a computer enclosure for retaining a computer component, such as a power supply, in the computer enclosure. The frame comprises a tray for supporting the power supply thereon and an elongate arm extending from the tray. A first end of the arm is pivotally attached to the computer enclosure by a vertically extending pivot pin whereby the frame is horizontally movable between a retracted position and an extended position for selectively positioning the power supply out of the computer enclosure. Openings may be defined on a second end of the arm for engaging with projections formed on the computer enclosure for securing the second end of the arm to the computer enclosure.

BRIEF DESCRIPTION OF THE DRAWINGS

The present invention will be apparent to those skilled in the art by reading the following description of a preferred embodiment thereof, with reference to the accompanying drawings, in which:

FIG. 5 is a cross-sectional view showing the movable frame completely moved out of the computer enclosure.

DETAILED DESCRIPTION OF THE PREFERRED EMBODIMENT

Figure 1:
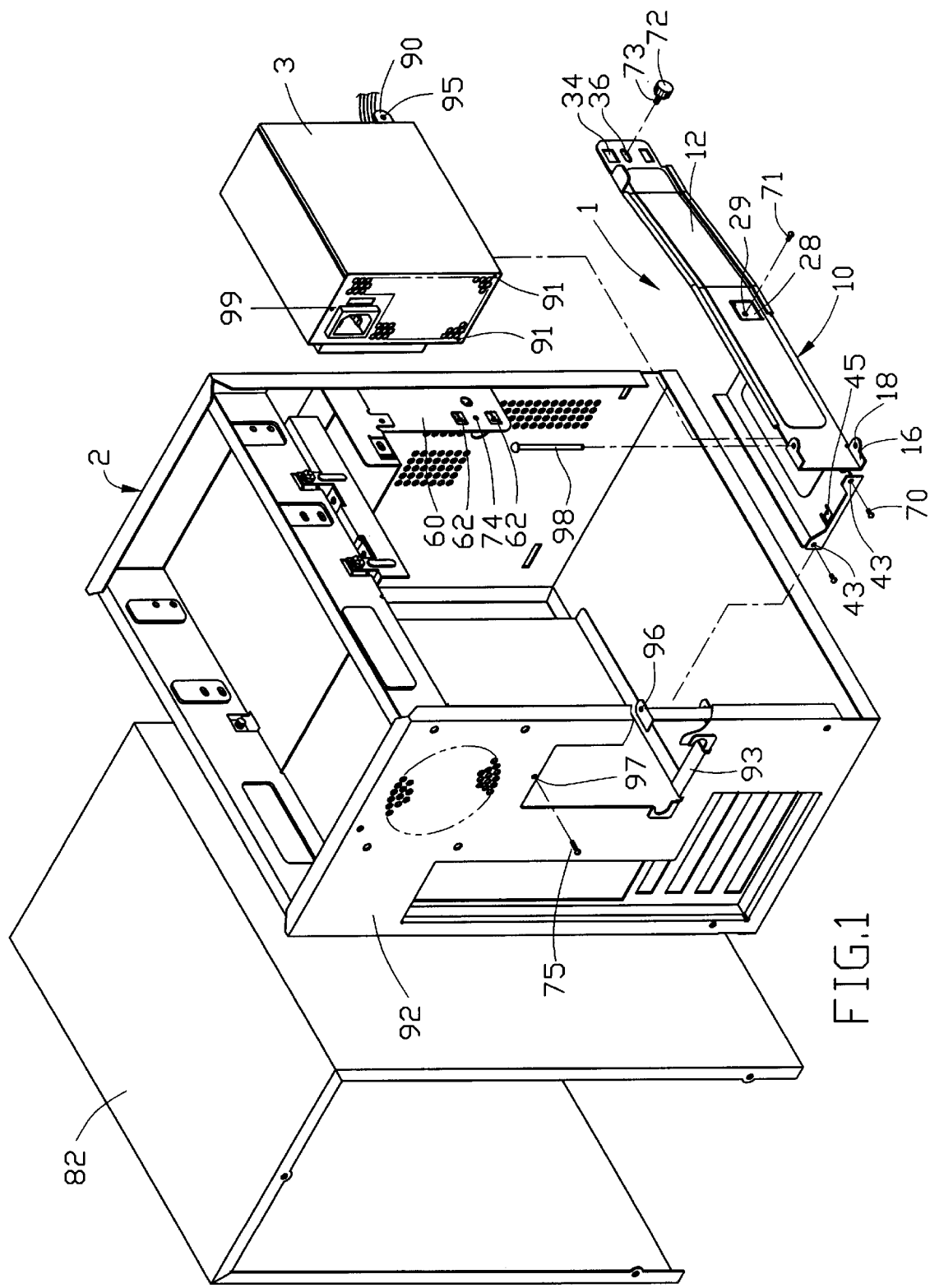
FIG. 1 is an exploded view of a computer in which a movable frame in accordance with the present invention is mounted.
Figure 2:
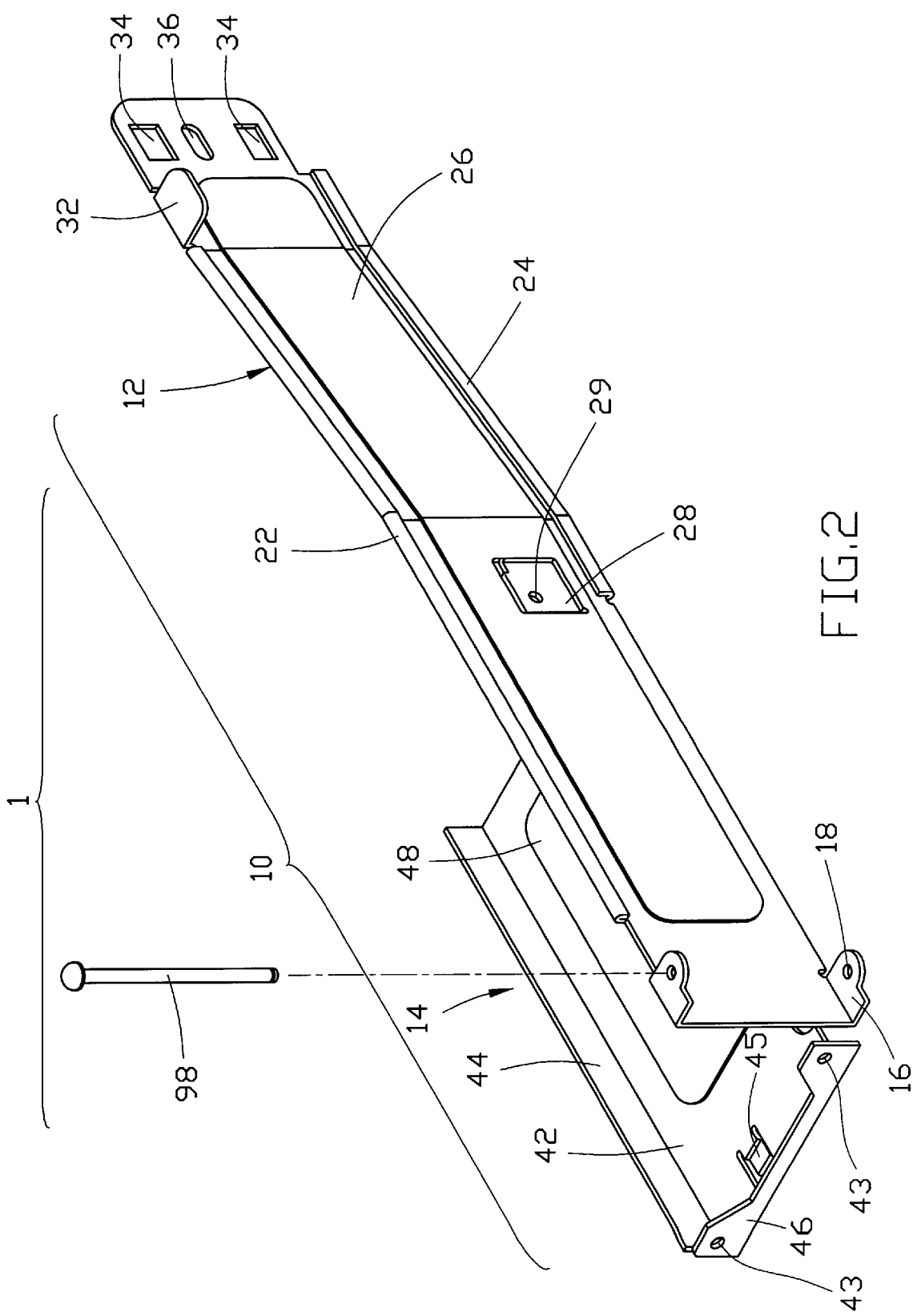
FIG. 2 is an exploded view of the movable frame of the present invention.

Referring to the drawings and in particular to FIGS. 1 and 2, a movable frame 1 constructed in accordance with the present invention is adapted to retain a computer component, such as a power supply 3 in the embodiment illustrated, in a computer enclosure 2. The movable frame 1 comprises a carrier 10 for supporting the power supply 3 and a pivot pin 98 for pivotally mounting the carrier 10 to the computer enclosure 2 whereby the carrier 10 and the power supply 3 are movable between a retracted position shown in FIG. 3 and an extended position shown in FIG. 5.

The carrier 10 comprises a tray 14 forming a bottom plate 42, a rear wall 46, and a side wall 44. An arm 12 extends from the tray 14 opposite the side wall 44. Holes 43 are defined in the rear wall 46 for receiving bolts 70 which engage with screw holes 91 of the power supply 3 thereby securing the power supply 3 to the tray 14. A raised portion 48 is formed on the bottom plate 42 for mechanical reinforcement purposes.

The arm 12 forms two opposite lugs 16 proximate a rear end thereof. The lugs 16 define vertically aligned holes 18 for receiving the pivot pin 98. The pivot pin 98 is retained in holes 96 defined in a rear panel 92 of the computer enclosure 2 thereby pivotally attaching the movable frame 1 to the computer enclosure 2 and allowing the frame 1 to move horizontally. The arm 12 has a front end in which openings 34 are defined for releasably engaging with projections 62 formed on a plate 60 of the computer enclosure 2 when the frame 1 is at the retracted position thereby securing the front end of the arm 12 to the computer enclosure 2.

The arm 12 has bent flanges 22, 24 formed on opposite edges thereof. The flanges 22, 24 are partially co-extensive with the arm 12 for mechanical reinforcement purposes. A raised web 26 is formed on the arm 12 between the flanges 22, 24 also for reinforcement purposes. An offset tab 28 is formed on the web 26 and a slit (not labeled) is defined therebetween for receiving an extension 90 of the power supply 3 thereby retaining the power supply 3 on the carrier 10. A hole 29 is defined in the offset tab 28 for receiving a bolt 71 adapted to engage with a screw hole 95 defined in the extension 90 for more securely retaining the power supply 3 on the carrier 10.

Figure 3:
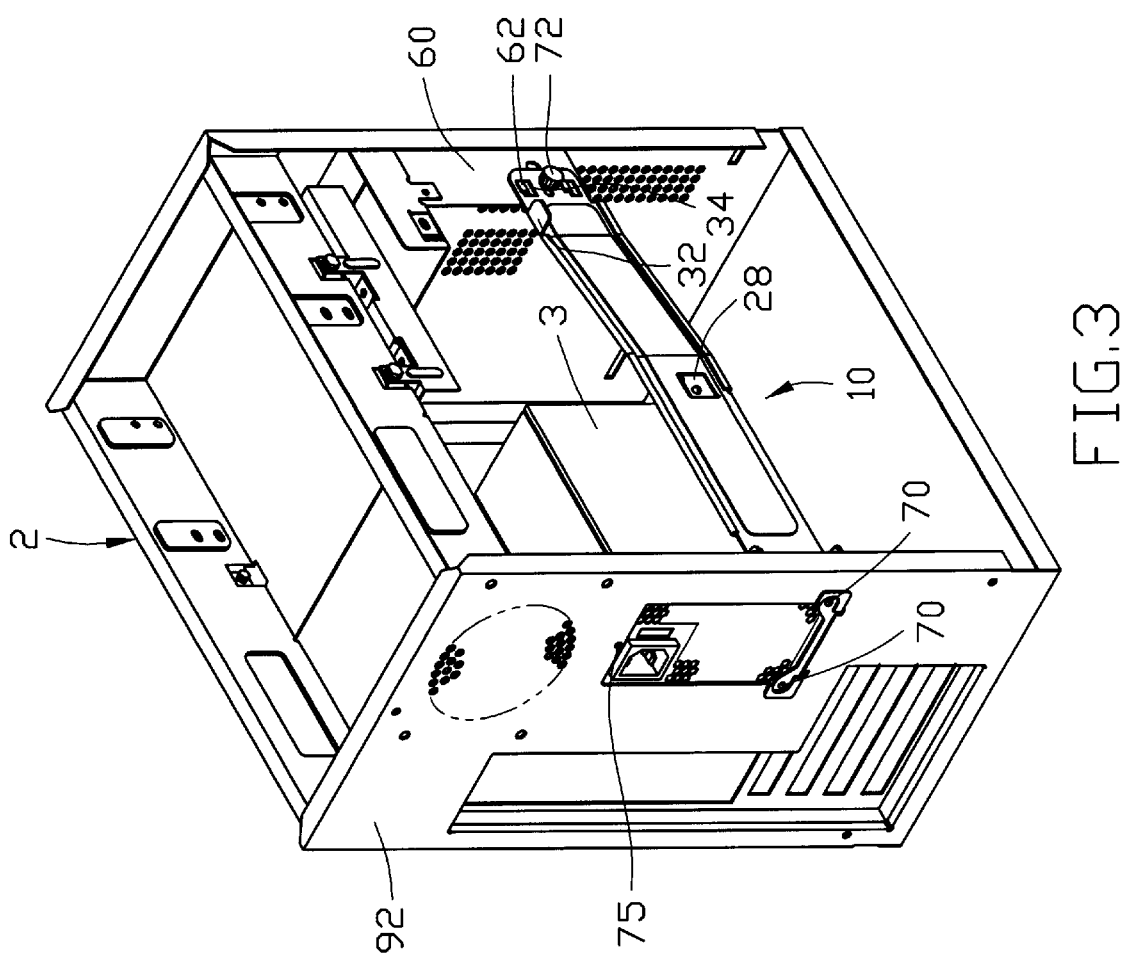
FIG. 3 is a perspective view of the assembled computer of FIG. 1 with an outer casing removed therefrom.

Also referring to FIG. 3, when the movable frame 1 is moved to the retracted position, the openings 34 of the front end of the arm 12 engage with the corresponding projections 62 of the computer enclosure 2, and the power supply 3 and the frame 1 are completely located inside the computer enclosure 2. The enclosure 2 comprises an outer casing 82 (FIG. 1) for shielding components inside the computer.

A knob 72 has a threaded rod 73 extending through a hole 36 defined in the front end of the arm 12 and engaging with a screw hole 74 for securing the front end of the arm 12 to the computer enclosure 2. Furthermore, at the retracted position, a bolt 75 may extend through a hole 97 defined in the rear panel 92 of the computer enclosure 2 to threadedly engage with a screw hole 99 defined in the power supply 3 for securing the power supply 3 to the computer enclosure 2. An offset tab 45 is formed on the bottom plate 42 of the carrier 14 defining a gap therebetween for receiving a flange 93 of the computer enclosure 2.

Figure 4:
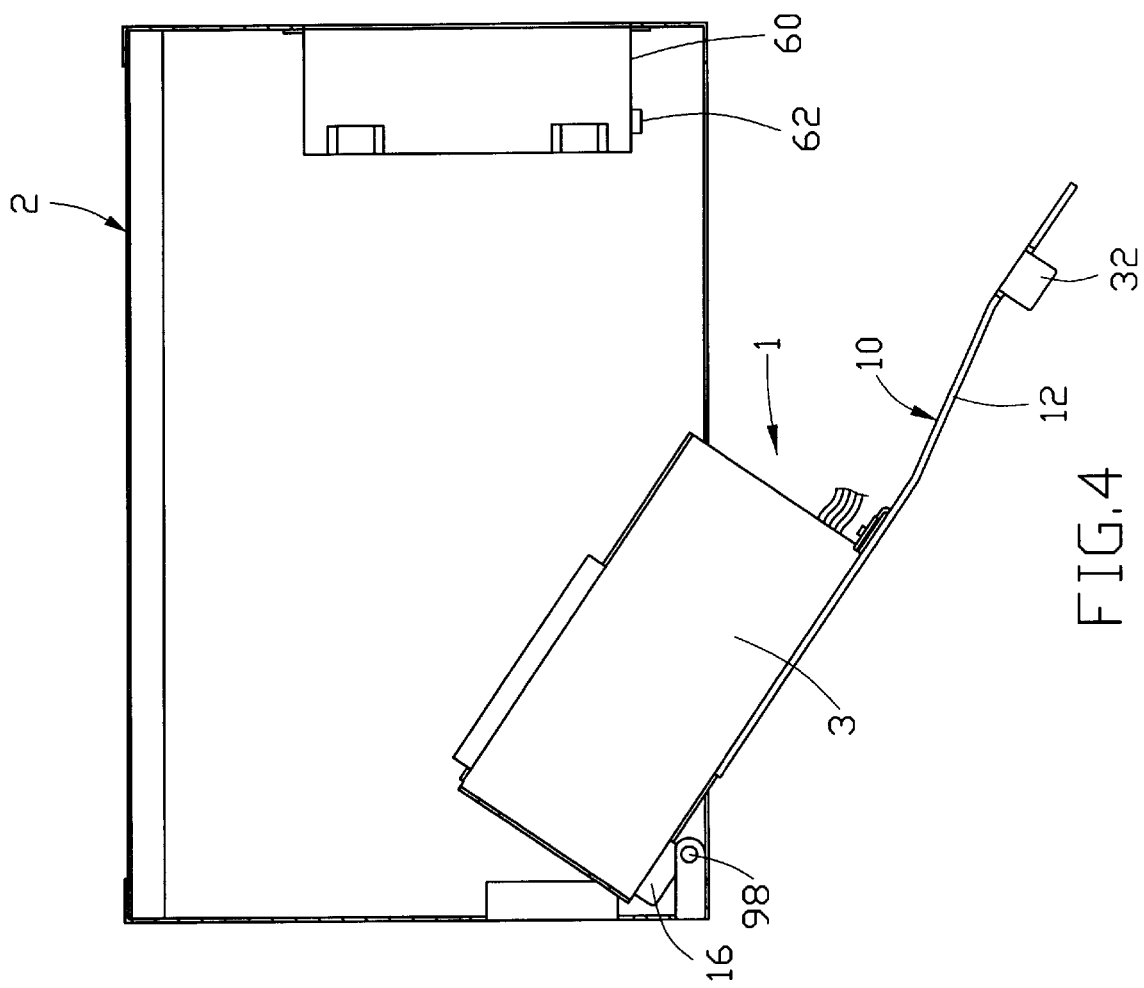
FIG. 4 is a cross-sectional view showing the movable frame partially moved out of an enclosure of the computer.

The arm 12 has a hand holding tab 32 formed on the front end thereof. A user may remove the knob 72 and grasp the hand holding tab 32 for moving the frame 1 from the retracted position to a partially extended position as shown in FIG. 4 whereby the power supply 3 is partially exposed. If desired, the user may further move the frame 1 to the fully extended position as shown in FIG. 5 thereby completely exposing the power supply 3 and a space inside the computer enclosure 2. Maintenance and repair operations may then be easily carried out.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A movable frame adapted to retain a computer component inside a computer enclosure comprising:

a carrier comprising a tray for supporting and retaining the computer component thereon and a planar arm extending perpendicularly from an edge of the tray, the arm having a first end forming two lugs defining vertically aligned holes and an opposite second end; and a pivot pin extending through the holes of the lugs and being received in corresponding bores defined in the enclosure thereby pivotally attaching the carrier to the enclosure for allowing the frame to be movable between a retracted position where the frame and the computer component retained thereon are completely received inside the enclosure, and an extended position where the frame is positioned outside the enclosure to expose the computer component and a space within the enclosure.

2. The movable frame as claimed in claim 1, wherein at least one opening is defined in the second end of the arm for engaging with a projection formed on the enclosure to retain the frame at the retracted position.

3. The movable frame as claimed in claim 1 further comprising a knob having a threaded rod extending through a hole defined in the front end of the arm for engaging with a screw hole defined in the enclosure thereby securing the front end of the arm to the enclosure.

4. The movable frame as claimed in claim 1, wherein the tray has at least a rear wall for retaining the computer component.

5. The movable frame as claimed in claim 4, wherein at least one hole is defined in the rear wall for receiving a bolt adapted to threadedly engage with a screw hole defined in the computer component thereby securing the computer component to the frame.

6. The movable frame as claimed in claim 1, wherein the arm is mounted to one edge of the tray, and wherein the tray has a side wall formed on an opposite edge thereof, the computer component being received between the side wall and the arm.

7. The movable frame as claimed in claim 1, wherein an offset tab is formed on the arm and a slit is defined between the offset tab and the arm for receiving and retaining an extension of the computer component.

8. The movable frame as claimed in claim 7, wherein a bolt secures the offset tab of the arm and the extension of the computer component together.

9. The movable frame as claimed in claim 1 further comprising a bolt for extending through a hole defined in the enclosure to threadedly engage with a screw hole defined in the computer component.

10. The movable frame as claimed in claim 1, wherein the arm comprises a hand holding tab for facilitating manual handling of the frame.

11. The movable frame as claimed in claim 1, wherein an offset tab is formed on a bottom plate of the tray for defining a gap therebetween to receive a flange of the enclosure when the frame is at the retracted position.

12. A computer enclosure comprising:

a panel; and a movable frame adapted to retain a computer component inside the computer enclosure, the frame comprising:

a carrier comprising a tray for supporting and retaining the computer component thereon and a planar arm extending perpendicularly from an edge of the tray, the arm having a first end forming two lugs defining vertically aligned holes and an opposite second end; and a pivot pin extending through the holes of the lugs and being received in corresponding bores defined in the panel thereby pivotally attaching the carrier to the panel for allowing the frame to be movable between a retracted position where the frame and the computer component retained thereon are completely located inside the enclosure, and an extended position where the frame is positioned outside the enclosure to expose the computer component and a space within the enclosure.

13. A computer enclosure assembly comprising:

a computer component;

a movable frame comprising a tray for associatively supporting the computer component thereon, said frame being hinged to the enclosure and adapted to be horizontally outwardly rotated to remove the associated computer component from the enclosure;

a fixing means for securing the frame and the computer component together;

a fixing means for securing the computer component and the enclosure together; and a fixing means for securing the frame and the enclosure together.

14. The enclosure assembly as claimed in claim 13, wherein the frame includes an arm extending in a front-to-back direction of the enclosure beyond the computer component.

15. The enclosure assembly as claimed in claim 14, wherein the fixing means for securing the frame and the enclosure and the fixing means for securing the frame and the computer component are provided on the arm.

16. A movable frame adapted to retain a computer component inside a computer enclosure comprising:

a carrier comprising a tray for supporting and retaining the computer component thereon and an arm extending therefrom, the arm having a first end forming two lugs defining vertically aligned holes and an opposite second end; and a pivot pin extending through the holes of the lugs and being received in corresponding bores defined in the enclosure thereby pivotally attaching the carrier to the enclosure for allowing the frame to be movable between a retracted position where the frame and the computer component retained thereon are completely received inside the enclosure, and an extended position where the frame is positioned outside the enclosure to expose the computer component and a space within the enclosure; wherein the tray has at least a rear wall for retaining the computer component.

\* \* \* \* \*